US009473872B2

(12) United States Patent
Kaura

(10) Patent No.: US 9,473,872 B2
(45) Date of Patent: Oct. 18, 2016

(54) SUPPLEMENTARY SERVICES MANAGEMENT SETTING CONTROL

(71) Applicant: Samsung Electronics Co., Ltd., Gyeonggi-do (KR)

(72) Inventor: Ricky Kumar Kaura, Middlesex (GB)

(73) Assignee: Samsung Electronics Co., Ltd., Suwon-si (KR)

(*) Notice: Subject to any disclaimer, the term of this patent is extended or adjusted under 35 U.S.C. 154(b) by 73 days.

(21) Appl. No.: 14/329,780

(22) Filed: Jul. 11, 2014

(65) Prior Publication Data

US 2015/0017966 A1 Jan. 15, 2015

(30) Foreign Application Priority Data

Jul. 11, 2013 (GB) .................................. 1312438.3

(51) Int. Cl.
| | | |
|---|---|---|
| *H04W 4/00* | (2009.01) | |
| *H04W 8/20* | (2009.01) | |
| *H04W 36/22* | (2009.01) | |
| *H04W 36/00* | (2009.01) | |

(52) U.S. Cl.
CPC ............ *H04W 4/001* (2013.01); *H04W 8/20* (2013.01); *H04W 36/0022* (2013.01)

(58) Field of Classification Search
CPC ....... H04W 80/10; H04W 8/18; H04W 4/12; H04W 4/16
See application file for complete search history.

(56) References Cited

U.S. PATENT DOCUMENTS

| | | |
|---|---|---|
| 7,817,554 B2 | 10/2010 | Skog et al. |
| 2008/0004007 A1* | 1/2008 | Kallio ......................... 455/432.2 |
| 2008/0020776 A1 | 1/2008 | Deshpande et al. |
| 2008/0219257 A1 | 9/2008 | Thiebaut et al. |

(Continued)

FOREIGN PATENT DOCUMENTS

| | | |
|---|---|---|
| WO | WO 2006/004471 A1 | 1/2006 |
| WO | WO 2008011610 A2 | 1/2008 |

(Continued)

OTHER PUBLICATIONS

3GPP TS 24.167 v10.2.0 (Mar. 2011) 3rd Generation Partnership Project; 3GPP TS 24.167 v10.2.0(Mar. 2011), Technical Specification Group Core Network and Terminals; 3GPP IMS Management Object (MO); Stage 3 (Release 10).*

(Continued)

*Primary Examiner* — Ayaz Sheikh
*Assistant Examiner* — Debebe Asefa

(57) ABSTRACT

A method of configuring a mobile terminal within a Long Term Evolution (LTE) compliant mobile wireless communications network. The method comprises controlling a first mobile terminal setting and communication the first mobile terminal setting from a network node to the mobile terminal. The first mobile terminal setting indicates whether supplementary services management setting controls originating from a mobile terminal are to be transmitted between the mobile terminal and an application server through an Internet Protocol (IP) Multimedia Subsystem (IMS) network. The first mobile terminal setting instructs the mobile terminal to modify a first configuration parameter within a first Open Mobile Alliance (OMA) Managed Object (MO) stored at the mobile terminal to indicate whether supplementary services management setting controls originating from the mobile terminal are to be transmitted through an IMS network.

20 Claims, 8 Drawing Sheets

(56) References Cited

U.S. PATENT DOCUMENTS

2010/0167705 A1    7/2010   Noldus et al.
2011/0250895 A1*  10/2011   Wohlert et al. .............. 455/445
2013/0194976 A1    8/2013   Choi
2013/0343279 A1   12/2013   Keller et al.

FOREIGN PATENT DOCUMENTS

WO    WO 2012/030067 A2   3/2012
WO    WO 2012076042 A1    6/2012

OTHER PUBLICATIONS

3GPP TS 24.390 V11.1.0 (Dec. 2012) Technical Specification 3rd Generation Partnership Project;Technical Specification Group Core Network and Terminals; Unstructured Supplementary Service Data (USSD) using IP Multimedia (IM) Core Network (CN) subsystem IMS;Stage 3 (Release 11).*

3GPP TS 24.305 V10.0.0 (Mar. 2011) Technical Specification 3rd Generation Partnership Project; Technical Specification Group Core Network and Terminals; Selective Disabling of 3GPP User Equipment Capabilities (SDoUE) Management Object (MO) (Release 10).*

International Search Report dated Sep. 29, 2014 in connection with International Application No. PCT/KR2014/006283; 4 pages.

Combined Search and Examination Report Under Sections 17 & 18(3) dated Dec. 23, 2013 in connection with United Kingdom Patent Application No. GB1312438.3; 2 pages.

* cited by examiner

SUPPLEMENTARY SERVICES MANAGEMENT SETTING CONTROL

CROSS-REFERENCE TO RELATED APPLICATION(S) AND CLAIM OF PRIORITY

The present application is related to and claims the priority under 35 U.S.C. §119(a) to United Kingdom Application No. GB1312438.3, which was filed in the United Kingdom Intellectual Property Office on Jul. 11, 2013, the entire content of which is hereby incorporated by reference.

TECHNICAL FIELD

The present disclosure relates to supplementary services management setting control. In particular, the present disclosure relates to setting whether supplementary services management setting control are to be transmitted through an Internet Protocol (IP) Multimedia Subsystem (IMS) network coupled to a Long Term Evolution (LTE) network when the setting control originates from a mobile terminal.

Embodiments of the present disclosure may be implemented in a 3rd Generation Partnership Project (3GPP) LTE or LTE Advanced compliant mobile communications network comprising a mobile terminal (also referred to herein as User Equipment, or UE) and network equipment.

BACKGROUND

Wireless or mobile communications networks in which a mobile terminal (UE, such as a mobile handset) communicates via a radio link to a network of base stations (eNBs) or other wireless access points connected to a telecommunications network, have undergone rapid development through a number of generations. The initial deployment of systems using analogue signaling has been superseded by second generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been replaced by or augmented by third generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards fourth generation (4G) systems.

3GPP design, specify and standardize technologies for mobile (cellular) wireless communications networks. Specifically 3GPP produces a series of technical reports (TR) and technical specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and LTE concerning the air interface. The first set of EPS specifications were released as 3GPP Release 8 in December 2008. LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

The present disclosure is implemented within an LTE mobile network. Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1, interfaces between different parts of the LTE system are shown. The double ended arrow indicates the air interface between the UE 102 and the E-UTRAN 104. For the remaining interfaces media is represented by solid lines and signaling is represented by dashed lines.

The E-UTRAN 104 comprises a single type of component: an eNB which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signaling messages exchanged with the UE 102 through the E-UTRAN 104. Each UE is registered with a single MME. There is no direct signaling pathway between the MME 114 and the UE 102 (communication with the UE 102 being across the air interface via the E-UTRAN 104). Signaling messages between the MME 114 and the UE 102 comprise EPS Session Management (ESM) protocol messages controlling the flow of data from the UE to the outside world and EPS Mobility Management (EMM) protocol messages controlling the rerouting of signaling and data flows when the UE 102 moves between eNBs within the E-UTRAN. The MME 114 exchanges signaling traffic with the S-GW 110 to assist with routing data traffic. The MME 114 also communicates with a Home Subscriber Server (HSS) 116 which stores information about users registered with the network.

LTE is designed as a Packet Switched (PS) network that imposes no limitations on the type of data traffic that is carried. For the bulk of data traffic the data applications are implemented by third parties, or at least separate from the LTE delivery network (for instance, email and web browsing services). However, telephony services have historically been closely integrated to the delivery network and it is desirable to continue to closely integrate telephony services with the LTE network. Telephony services principally relate to voice calls and the Short Messaging Service (SMS). On top of telephony services, a range of Supplementary Services (SS) are commonly deployed in mobile communications networks, including, for instance, call waiting, call hold, call forwarding, call barring, conferencing and number identification.

There are strong commercial pressures for network operators to tightly integrate telephony services into LTE networks as the revenue that can be generated from telephony services is disproportionately large compared with general data services. If telephony services (and supplementary services) are treated like any other data traffic and provided by a third party (for instance by connecting the EPC to an externally provided Voice over IP (VoIP) service), then the revenue that can be generated is at best shared. Additionally, there are performance and quality implications for telephony services that are best served by close integration.

There are two main approaches for an LTE network operator to implement telephony and supplementary services: using an IP Multimedia Subsystem (IMS) and Circuit Switched Fall Back (CSFB).

An IMS is a separate 3GPP network which is coupled to the EPC and which provides real time IP multimedia services, including telephony services through VoIP. An IMS network coupled to an LTE network allows for voice calls that are carried from end to end as VoIP (for calls originating and terminating at UEs within the LTE network). An IMS network may also be directly connected to a GSM network, a UMTS network, other types of mobile communication network or a Public Switched Telephone Network (PSTN: a landline communications network) such that calls originating or terminating at UEs or phones outside of the LTE network are partially carried over Circuit Switched (CS) bearers. A full description of an IMS network will not be provided here as this will be well known to the skilled person, though an overview is provided below in connection with FIG. 2. It is noted only that the principal connection between the LTE network and the IMS network is through the P-GW. Additional signaling may be passed to and from the LTE network through a Policy and Charging Rules Function (PCRF) for requesting dedicated EPS bearers to carry voice calls, and which meet the necessary qualify of service requirements. The PCRF is connected to the P-GW. A subscriber to an LTE mobile communications network is able to make voice over LTE calls if they have UE that is compliant with GSMA PRD IR.92 and the network operator has a deployed IMS network. It may also be necessary for the subscriber to have a voice over LTE subscription with the network operator.

The use of an IMS network to support telephony and supplementary services is promoted by the Voice Over LTB (VOLTE) initiative of the GSM Association (GSMA). GSMA Permanent Reference Document (PRD) IR.92 (IMS Profile for Voice and SMS) defines a minimum mandatory set of features defined in the respective 3GPP technical specifications that must be implemented by a UE and network equipment in order to ensure interoperable IMS-based telephony and supplementary IMS-based services over LTE. However, some LTE networks have been deployed before deployment of an IMS network. To address the need to provide subscribers and users of those networks with telephony and supplementary services, 3GPP have standardized CSFB in 3GPP TS 23.272 (Circuit Switched (CS) Fall Back in Evolved Packet System (EPS)). Using CSFB, to place or receive a voice call, a UE falls back to a CS mobile communications network, such as GSM or UMTS. A full description of CSFB will not be provided here as this will be well known to the skilled person, though an overview is provided below in connection with FIG. 3. It is noted only that an MME communicates with a GSM or UMTS Mobile Switching Centre (MSC), which supports CSFB, across an interface designated SGs. Upon registering a UE with an MME (for instance, when the UE is first switched on) the UE is also registered with an MSC so as to place or receive CS voice calls via the CS network. To place or receive a CS voice call may require the UE to move from LTE to UMTS or GSM. This can add considerable delay to voice calls.

3GPP defines configuration parameters for voice calls and SMS that are controlled by the network operator. These are implemented in Open Mobile Alliance (OMA) Managed Objects (MO) as specified for instance in 3GPP TS 24.305 (Selective Disabling of 3GPP User Equipment Capabilities (SDoUE) Management Object (MO)) and 3GPP TS 24.167 (3GPP IMS Management Object (MO)) amongst others. However, in order to minimize complexity, GSMA PRD IR.92 seeks to minimize the use of configuration parameters set through MOs. Given that GSMA PRD IR.92 provides a profile of a minimum set of mandatory features, a large proportion of configuration parameters that are configurable by the network operator using MOs within the 3GPP specifications may be preconfigured, for instance set by the UE manufacturer.

For a UE that is only LTE capable (that is, the UE is unable to operate with CSFB and all telephony and supplementary services must be handled by an IMS network) there is no need for any MOs at all. However, as discussed above, UEs restricted to LTE are not able to function correctly on a large number of networks where CSFB is necessary, for instance to make voice calls.

For UEs also supporting CS access, then for voice and SMS support GSMA PRD IR.92 mandates in Annex A.2 that a UE must perform voice domain selection for originating sessions with the setting of "IMS PS Voice preferred, CS voice as secondary" as specified in 3GPP TS 23.221 (Architectural requirements) Section 7.2a. This does not need to be a configuration parameter specified by an MO and this can be preconfigured by the UE manufacturer. The IMS MO defined in 3GPP TS 24.167, and specifically the corresponding MO parameter "Voice_Domain_Preference_E_UTRAN" specified in section 5.27 is not used in GSMA PRD IR.92. This MO parameter also allows the restriction to CS voice only, CS voice preferred PS secondary, PS voice preferred CS secondary or PS voice only.

For UEs also supporting CS access, there may be instances where the operator would like to have control over whether a particular subscriber can be allowed to make voice calls over LTE, for instance if the subscriber is late making payments and the operator wishes to restrict the network functions available to the user. Additionally, if the subscriber has put their Subscriber Identity Module (SIM) allowing voice over LTE into a UE that does not comply with GSMA PRD IR.92, the network operator may wish to prevent the UE attempting to make voice over LTE calls. However, this restriction to using only CSFB is not currently possible under GSMA PRD IR.92.

For UEs also supporting CS access, GSMA PRD IR.92 does allow the use of an MO for SMS, specifically to support SMS over IP (using the IMS) and SMS over SGs (using the CS network across the interface between the MME and the MSC). GSMA PRD IR.92 allows the network operator to either preconfigure the UE to only use SMS over IP or only use SMS over SGs. Alternatively, the network operator can configure the UE to use SMS over SGs when required through the use of the IMS MO defined in 3GPP TS 24.167, and specifically the MO configuration parameter "SMS_Over_IP_Networks_Indication" specified in section 5.28. This MO configuration parameter allows a choice between SMS over SGs only or SMS over IP preferred SMS over SGs secondary.

For UEs also supporting CS access, the UE can use CSFB to perform call independent supplementary services (structured supplementary services) and Unstructured Supplementary Services Data (USSD) operations (operator defined supplementary services). GSMA PRD IR.92, section 2.3.2 and Annex A.4, mandates the use of the eXtendable Markup Language (XML) Configuration Access Protocol (XCAP)/Ut interface (the interface between the UE and an Application Server (AS) within the IMS) for supplementary services management setting control originating from the mobile terminal.

Supplementary services management setting control describes the ability for the user (using the UE) to interrogate (that is, view) supplementary service settings, modify existing supplementary service settings and perform deactivation/activation/deregistration/registration of existing supplementary services. An example of interrogation is when the user wishes to know what their current communication diversion number and service status is set to for a specific communication diversion supplementary service (for instance, communication diversion on busy subscriber). An example of modification of an existing setting may be to change the communication barring password that the operator normally assigns by default and the user is allowed to change. Such a password is used as authorization to change barring settings. An example of deactivation of a supplementary service is allowing the communication forwarding number to still be registered, but to just deactivate the service. An example of deregistration of a supplementary service is allowing the communication forwarding service registration data (for instance, communication forwarding number) to be removed thus also deactivating the service.

In some circumstances it is desirable to allow the use of the IMS network for supplementary services management setting control originating from the mobile terminal even where voice calls are transmitted using CSFB. For example when the UE falls back to the CS domain, nothing prevents the operator from using network based IMS Centralized Services (ICS) through a deployed MSC server enhanced for ICS. When the IMS UE connects to an MSC server enhanced for ICS, the CS voice signaling is interworked through to IMS, and the UE can still make use of XCAP/Ut to modify these service that are centralized in IMS. 3GPP (and therefore also GSMA PRD IR.92) does not specify any mechanism for the use of CSFB for supplementary services management setting control originating from the mobile terminal. A VOLTE capable UE that would normally use the XCAP/Ut interface to make supplementary services management setting control changes will continue to try to use this interface even in the event that the UE is connected to an LTE network without an IMS. Currently, the only way to prevent this is through configuration within the UE by UE manufacturers and network operators in order to try to the CSFB if the UE fails to use XCAP/Ut. However, there is no guidance for UE manufacturers how this can be done, which risks interoperability problems.

SUMMARY

To address the above-discussed deficiencies, it is a primary object to provide greater control for network operators for configuring the use of CSFB for telephony and supplementary services. In particular, certain embodiments of the present disclosure aim to provide greater control for network operators for the use of an IMS network for supplementary services management setting control originating from a mobile terminal. In certain embodiments of the disclosure this is achieve through extensions of or modifications to existing 3GPP MOs.

According to a first aspect of the present disclosure there is provided a method of configuring a mobile terminal within a Long Term Evolution (LTE) compliant mobile wireless communications network. The method includes controlling a first mobile terminal setting indicating whether supplementary services management setting controls originating from a mobile terminal are to be transmitted between the mobile terminal and an application server through an Internet Protocol (IP) Multimedia Subsystem (IMS) network; and communicating the first mobile terminal setting from a network node to the mobile terminal; wherein the first mobile terminal setting instructs the mobile terminal to modify a first configuration parameter within a first Open Mobile Alliance (OMA) Managed Object (MO) stored at the mobile terminal to indicate whether supplementary services management setting controls originating from the mobile terminal are to be transmitted through an IMS network.

Advantageously, certain embodiments of the present disclosure allow greater control over supplementary services management setting control originating from a mobile terminal, in particular in the event of unavailability of an IMS network to a particular subscriber.

The method may further comprise controlling a second mobile terminal setting indicating whether structured supplementary services management setting controls originating from a mobile terminal and transmitted between the mobile terminal and the application server through an IMS network are to be transmitted across an eXtendable Markup Language (XML) Configuration Access Protocol, XCAP/Ut interface as specified in the 3rd Generation Partnership Project (3GPP) Technical Specification (TS) 24.623 or are to be transmitted using Session Initiation Protocol (SIP) based user configuration as specified in 3GPP TS 24.238; and communicating the second mobile terminal setting from the network node to the mobile terminal; wherein the second mobile terminal setting instructs the mobile terminal to modify a second configuration parameter within the first OMA MO to indicate whether structured supplementary services management setting controls originating from the mobile terminal are to be transmitted through an IMS network across the XCAP/Ut interface or using SIP-based user configuration.

The method may further comprise controlling a third mobile terminal setting indicating whether unstructured supplementary services management setting controls originating from a mobile terminal and transmitted through an IMS network are to be transmitted between the mobile terminal and the application server using Unstructured Supplementary Services Data (USSD) in IMS (USSI) as specified in 3GPP TS 24.390; and communicating the third mobile terminal setting from the network device to the mobile terminal; wherein the third mobile terminal setting instructs the mobile terminal to modify a third configuration parameter within the first OMA MO to indicate whether unstructured supplementary services management setting controls originating from the mobile terminal are to be transmitted using USSI.

Each first, second or third configuration parameter may comprise a leaf within an MO for configuring an IMS network.

The MO for configuring an IMS network may comprise the IMS MO specified in 3GPP TS 24.167 modified to include at least one new leaf for controlling each first, second or third configuration parameter.

The method may further comprise controlling, at the network device, a fourth mobile terminal setting indicating whether the transmission of voice calls, Short Message Service (SMS) messages and supplementary services management setting controls originating from a mobile terminal for voice services and SMS through an IMS network is enabled or disabled; and communicating the fourth mobile terminal setting from the network device to the mobile terminal; wherein the fourth mobile terminal setting instructs the mobile terminal to modify a fourth configuration parameter within a second OMA MO stored at the mobile terminal to indicate whether the transmission of voice calls, SMS messages and supplementary services management setting controls originating from a mobile terminal for voice services and SMS through an IMS network is enabled or disabled.

The fourth configuration parameter may comprise a leaf within an MO for selectively disabling mobile terminal capabilities.

The MO for selectively disabling mobile terminal capabilities may comprise the Selective Disabling of 3GPP User Equipment Capabilities (SDoUE) MO specified in 3GPP TS 24.305 modified to include a new leaf for controlling the fourth configuration parameter.

According to a second aspect of the present disclosure there is provided a method of operating a mobile terminal within a Long Term Evolution (LTE) compliant mobile wireless communications network. The method includes receiving from a network node a first mobile terminal setting indicating whether supplementary services management setting controls originating from the mobile terminal are to be transmitted between the mobile terminal and an application server through an Internet Protocol (IP) Multimedia Subsystem (IMS) network; and configuring the mobile terminal in response to the received first mobile terminal setting by modifying a first configuration parameter within a first Open Mobile Alliance (OMA) Managed Object (MO) stored at the mobile terminal to indicate whether supplementary services management setting controls originating from the mobile terminal are to be transmitted through an IMS network; wherein if the first configuration parameter indicates that supplementary services management setting controls originating from the mobile terminal can be transmitted through an IMS network, the method further comprises: sending a supplementary services management setting control to the application server using the IMS network.

The method may further comprise receiving from a network device a second mobile terminal setting indicating whether structured supplementary services management setting controls originating from a mobile terminal and transmitted between the mobile terminal and the application server through an IMS network are to be transmitted across an eXtendable Markup Language (XML) Configuration Access Protocol, XCAP/Ut interface as specified in the 3$^{rd}$ Generation Partnership Project (3GPP) Technical Specification (TS) 24.623 or are to be transmitted using Session Initiation Protocol (SIP) based user configuration as specified in 3GPP TS 24.238; and configuring the mobile terminal in response to the received second mobile terminal setting by modifying a second configuration parameter within the first OMA MO to indicate whether structured supplementary services management setting controls originating from the mobile terminal are to be transmitted through an IMS network across the XCAP/Ut interface or using SIP-based user configuration; wherein if the first configuration parameter indicates that supplementary services management setting controls originating from the mobile terminal can be transmitted through an IMS network, the method further comprises: determining whether structured supplementary services management setting controls originating from the mobile terminal are to be transmitted through an IMS network across the XCAP/Ut interface or using SIP-based user configuration; and sending a structured supplementary services management setting control to the application server using the IMS network across the XCAP/Ut interface or using SIP-based user configuration according to the result of the determination.

The method may further comprise receiving from a network device a third mobile terminal setting indicating whether unstructured supplementary services management setting controls originating from a mobile terminal and transmitted through an IMS network are to be transmitted between the mobile terminal and the application server using Unstructured Supplementary Services Data, USSD, in IMS, USSI, as specified in 3GPP TS 24,390; and configuring the mobile terminal in response to the received third mobile terminal setting by modifying a third configuration parameter within the first OMA MO to indicate whether unstructured supplementary services management setting controls originating from the mobile terminal are to be transmitted using USSI; wherein if the first configuration parameter indicates that supplementary services management setting controls originating from the mobile terminal can be transmitted through an IMS network, and the third configuration parameter indicates that unstructured supplementary services management setting controls originating from the mobile terminal are to be transmitted using USSI, the method further comprises: sending an unstructured supplementary services management setting control to the application server using USSI.

Each first, second or third configuration parameter may comprise a leaf within an MO for configuring an IMS network.

The MO for configuring an IMS network may comprise the IMS MO specified in 3GPP TS 24.167 modified to include at least one new leaf for controlling each first, second or third configuration parameter.

The method may further comprise receiving from a network device, a fourth mobile terminal setting indicating whether the transmission of voice calls, Short Message Service (SMS) messages and supplementary services management setting controls originating from a mobile terminal for voice and SMS through an IMS network is enabled or disabled; and configuring the mobile terminal in response to the fourth mobile terminal setting by modifying a fourth configuration parameter within a second OMA MO stored at the mobile terminal to indicate whether the transmission of voice calls, SMS messages and supplementary services management setting controls for voice and SMS originating from a mobile terminal through an IMS network is enabled or disabled.

The fourth configuration parameter may comprise a leaf within an MO for selectively disabling mobile terminal capabilities.

The MO for selectively disabling mobile terminal capabilities may comprise the Selective Disabling of 3GPP User Equipment Capabilities (SDoUE) MO specified in 3GPP TS 24.305 modified to include a new leaf for controlling the fourth configuration parameter.

According to a third aspect of the present disclosure there is provided a network node coupled to or within a Long Term Evolution (LTE) compliant mobile wireless communications network, the network device being arranged to implement the above method of configuring a mobile terminal within an LTE network.

According to a fourth aspect of the present disclosure there is provided a mobile terminal within a Long Term Evolution (LTE) compliant mobile wireless communications network, the mobile terminal being arranged to implement the above method of operating a mobile terminal.

Another aspect of the disclosure provides a computer program comprising instructions arranged, when executed, to implement a method and/or apparatus in accordance with any one of the above-described aspects. A further aspect provides machine-readable storage storing such a program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 2 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or system. Embodiments of the disclosure will now be described in the context of an LTE compliant mobile wireless communications network operating in accordance with Release-11 and beyond of the 3GPP LTE standards. However, it will be understood that this is by way of example only and that other embodiments may involve other wireless networks, operating at least partially in compliance with other releases and other standards.

Figure 1:
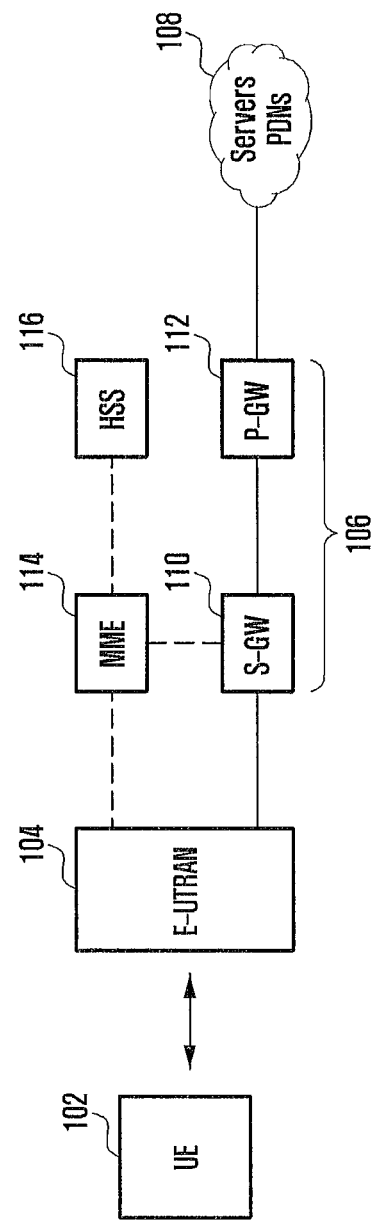
FIG. 1 schematically illustrates an overview of an LTE mobile communication network.
Figure 2:
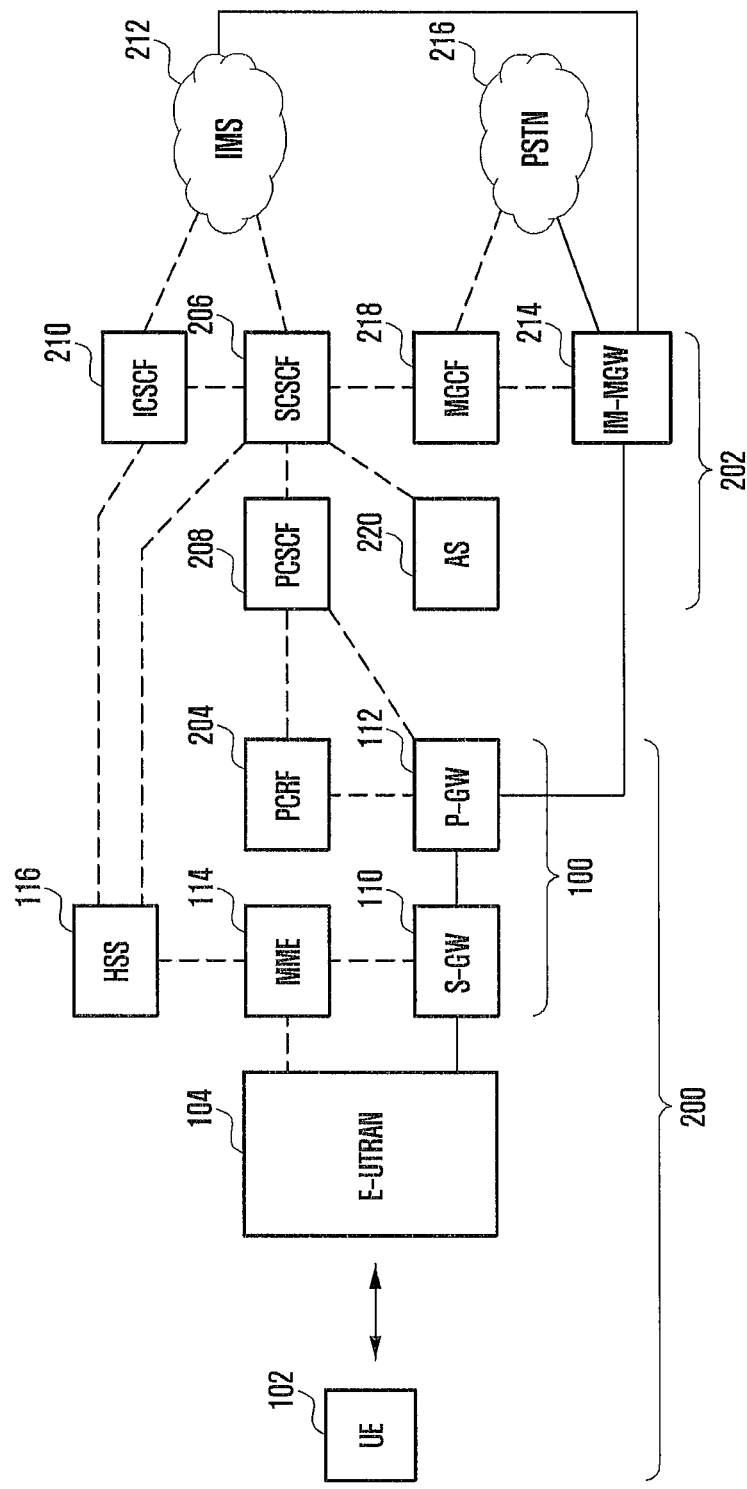
FIG. 2 schematically illustrates an overview of an LTE mobile communication network couple to an IMS network.

Referring now to FIG. 2, this schematically illustrates an overview of an LTE mobile communication network 200 coupled to an IMS network 202 for implementing telephony and supplementary services over LTE. Features common to the LTE network shown in FIG. 1 are given the same reference numbers and are not described again. As in FIG. 1 interfaces between different parts of the LTE system are shown. The double ended arrow indicates the air interface between the UE 102 and the E-UTRAN 104. For the remaining interfaces media is represented by solid lines and signaling is represented by dashed lines. It will be appreciated that FIG. 2 is a simplification of both the LTE network 200 and the IMS network 202, and that both networks may contain further components and multiple instances of each component.

As noted above, for interoperation with an IMS network 202 the LTE network 200 further comprises a PCRF 204 arranged, for instance, to receive signaling messages requesting voice call bearers. The most important components of the IMS network 202 are the Call Session Control Functions (CSCF). A Serving CSCF (SCSCF) 206 controls the UE 102 in an analogous way to the control of the MME 114 of the UE 102. Each UE 102 registers with a single SCSCF 206 for handling voice calls, including setting up new calls and notifying the UE 102 of received calls. A Proxy CSCF (PCSCF) 208 routes signaling between the PCRF 204 and the appropriate SCSCF 206 to ensure the appropriate quality of service for the LTE bearers and compresses signaling between the SCSCF 206 and the P-GW 112 to reduce traffic across the LTE network 200. An Interrogating CSCF (ICSCF) 210 receives signaling messages for new calls to and from another IMS 212 (with further signaling between IMS 202 and IMS 212 passed through the SCSCF 206.

An IMS Media Gateway (IM-MGW) 214 routes voice data traffic between the P-GW 112 within the LTE network 200 and another UE connected to the same LTE network (not shown), another IMS network 212 or the PSTN 216. The IM-MGW is under the control of signaling messages received from a Media Gateway Control Function (MGCF)

218, in turn from the SCSCF 206. If appropriate the MGCF 218 also passes signaling to the PSTN 216. When communicating with the PSTN 216, the IM-MGW 214 converts voice call data between PS data and CS data, and the MGCF 218 similarly converts signaling messages. An Application Server (AS) 220 provides the UE with supplementary services such as voicemail. In order to control call routing the SCSCF 206 and the ICSCF 210 communicate with the HSS 116.

Figure 3:
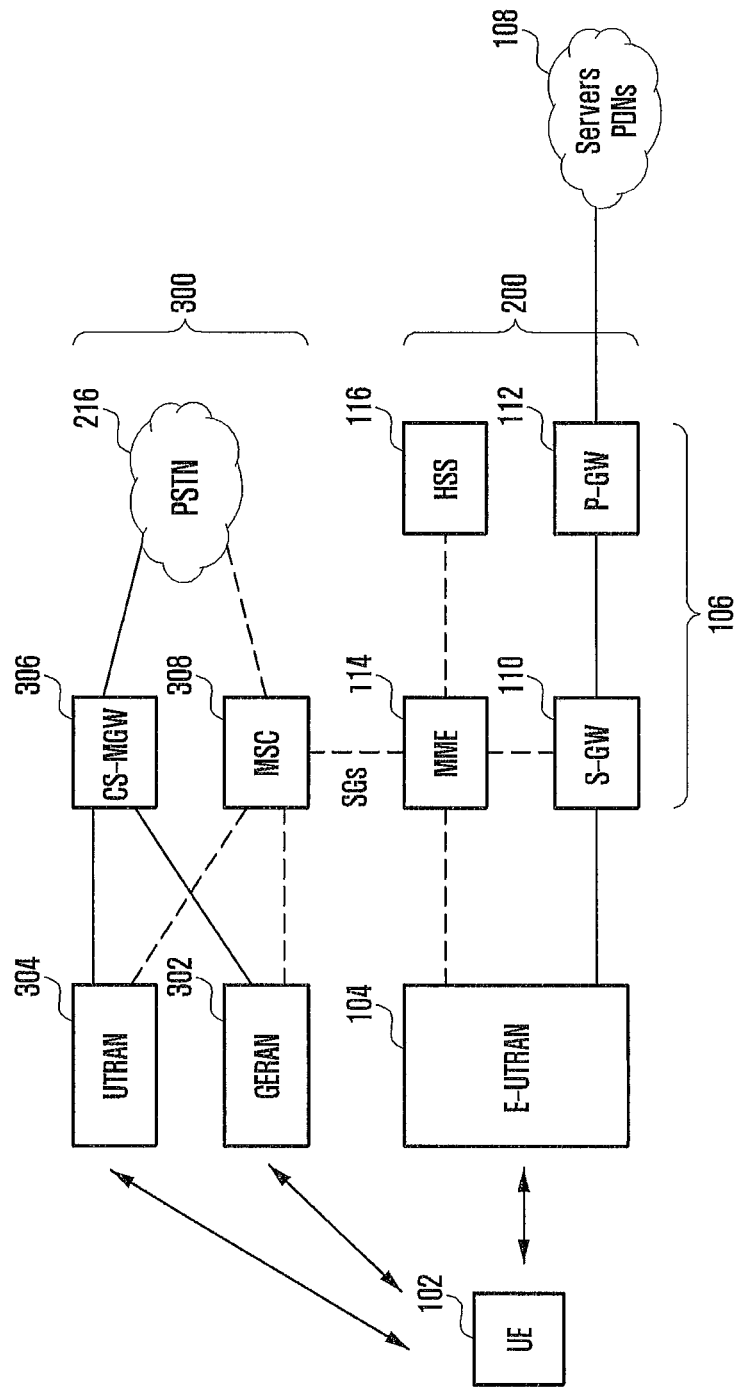
FIG. 3 schematically illustrates an overview of an LTE mobile communication network couple to a CS mobile communication network.

Referring now to FIG. 3, this schematically illustrates an overview of an LTE mobile communication network 200 coupled to a CS network 300 for CSFB. Features common to the LTE network shown in FIG. 1 are given the same reference numbers and are not described again. As in FIG. 1, interfaces between different parts of the LTE system are shown. The double ended arrow indicates the air interface between the UE 102 and the E-UTRAN 104. For the remaining interfaces media is represented by solid lines and signaling is represented by dashed lines. It will be appreciated that FIG. 3 is a simplification of both the LTE network 200 and the CS network 300, and that both networks may contain further components and multiple instances of each component. It will be appreciated that a single LTE network may have both an associated IMS network and interconnections with a CS network for CSFB, and so in practice the LTE network may have the interconnections shown in FIGS. 2 and 3.

In the example of a CS network 300 shown in FIG. 3, the UE 102 can communicate with the E-UTRAN 104 and also either a GERAN 302 or a UTRAN 304 across the air interface, though it will be understood that it may be that only a GERAN 302 or a UTRAN 304 is provided. Voice data traffic is supplied to the appropriate CS Radio Access Network (RAN) via a CS Media Gateway (CS MGW) 306, which in turn receives the voice data traffic from the PSTN 216 (or another CS MGW 306, not shown). Signaling messages are passed to the appropriate RAN through a Mobile Switching Centre (MSC) 308, and again signaling messages are received from the PSTN 216 or another MSC 308. For CSFB, signaling messages are exchanged between the MME 114 and the MSC 308. The interface between the MME 114 and the MSC 308 is the SGs interface. For CSFB the UE makes voice calls by moving to a CS mobile communication network within the 2G or 3G CS domain. SMS messages can also be exchanged across the SGs interface ("SMS over SGs"), and are handled by the LTE network 200 as generic data packets. The UE 102 does not have to move to the 2G or 3G network to send or receive SMS messages using SMS over SGs. CSFB in 3GPP may be implemented through a number of different mechanisms depending on whether it is CSFB to UTRAN or GERAN. A first mechanism known as "RRC Connection Release with Redirection" terminates a current Radio Resource Control (RRC) connection of the UE with the E-UTRAN and an information element is provided in the termination packet indicating a carrier frequency on the UTRAN/GERAN. The UE then uses the carrier frequency to select a suitable cell to attach to. System Information may also be provided related to one or more UTRAN/GERAN cells that the UE should move to, to reduce call set up delay. A second mechanism is known as "PS Handover" in which the eNB moves packet switched bearers to the target GERAN/UTRAN, which advantageously does not interrupt those bearers, though this is not applicable to CSFB for voice calls. Further mechanisms are also defined.

According to certain embodiments of the present disclosure, it is possible for a network operator to separately configure the use of voice, SMS and supplementary services management setting control for a UE that is operable in both a PS domain using an IMS network coupled to an LTE network and a CS domain through a CS network such as a GSM network or a UMTS network. As discussed above in the Background of the Disclosure section, 3GPP TS 24.167 defines an IMS MO which is stored at the UE, The IMS MO is compatible with the OMA Device Management (DM) protocol specifications, version 1.2 and upward. The IMS MO defines parameters that can be managed for the IMS network, including for configuring whether voice calls should be handled by the IMS network or via CSFB and whether SMS messages should be transmitted as SMS over IP or SMS over SGs. FIG. 1 of TS 24.167 defines the nodes and leaf objects of the MO. The node <X> acts as a placeholder for one or more accounts for a fixed node. Each leaf defines a parameter which may be controlled by the network operator and therefore be used to control the operation of a UE. The network operator uses OMA (Open Mobile Alliance) DM (Device Management) to make changes to the Managed Object which is stored on the UE. An OMA DM client within the mobile terminal connects to an OMA device management server coupled to the LTE network to receive updates to the IMS MO within the mobile terminal. The OMA server is not part of the LTE network; rather it is separate from the LTE network and uses wireless transport provided by the LTE network to make modifications to the MO stored at the UE. In practice, the OMA DM server may be implemented by a network device within the LTE network, however the present disclosure is not limited to any one particular hardware implementation. OMA DM clients and servers will be well known to the skilled person, and further details can be found at the Open Mobile Alliance website (http://technical.openmobilealliance.org/Technical/current_releases.aspx). Specifically, the network operator, through the OMA device management server within the LTE network equipment controls a mobile terminal setting which is communicated to the mobile terminal to update the IMS MO. The way in which the UE implements these changes is at the discretion of UE manufacturers.

Figure 4:
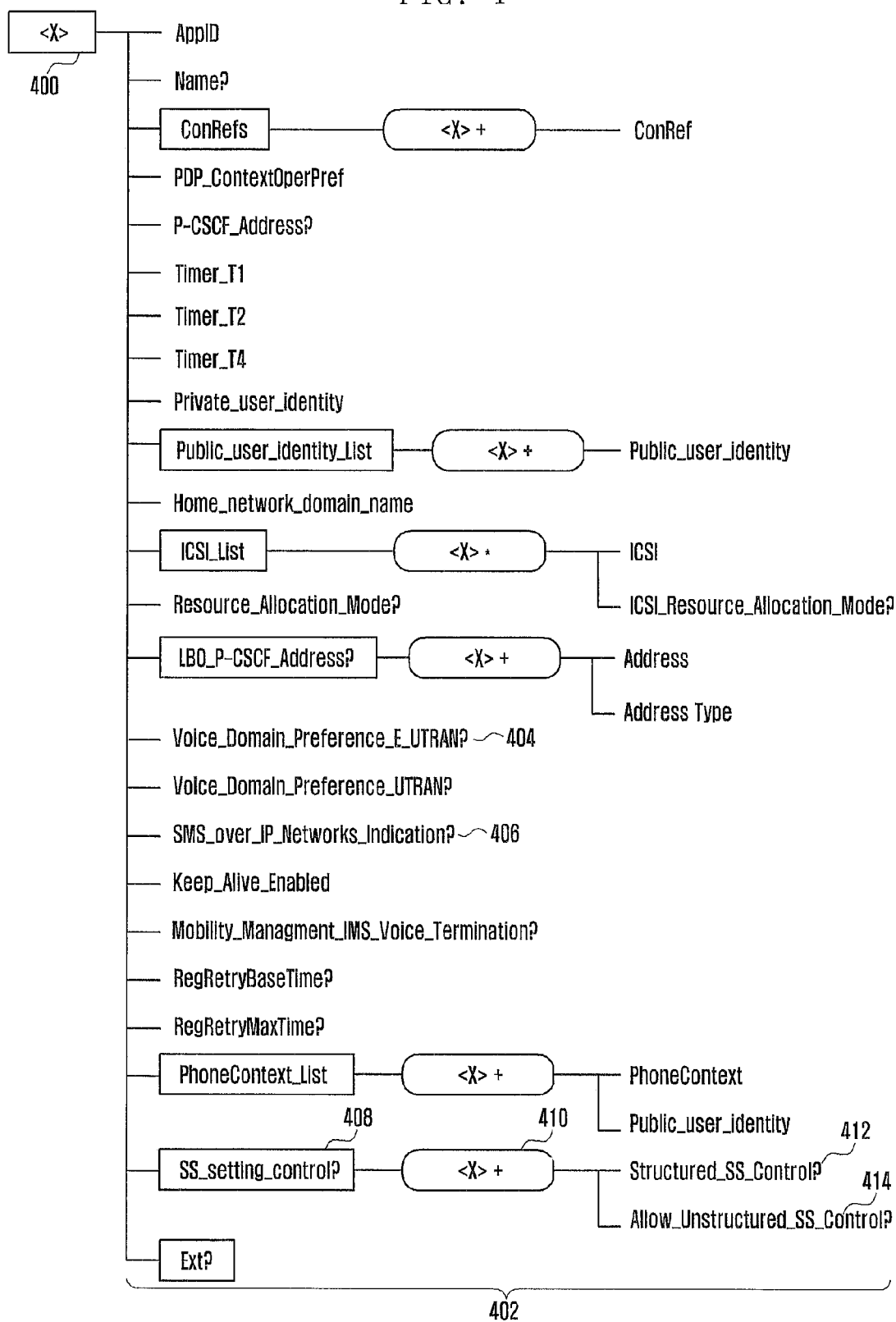
FIG. 4 illustrates a modified version of the MO defined by 3GPP TS 24.167 in accordance with an embodiment of the present disclosure.

As discussed above, section 5.27 of 3GPP TS 24.167 defines the "Voice_Domain_Preference_E_UTRAN?" leaf which indicates the network operator's preference for selection of the domain to be used for voice communication services by the UE. Section 5.28 defines the "SMS_Over_IP_Networks_Indication?" leaf which indicates the network operator's preference for selection of the domain to be used for SMS messaging originating from a UE. In accordance with certain embodiments of the present disclosure, at least one new leaf is added to the IMS MO of 3GPP TS 24.167. The at least one new leaf controls whether (and optionally how) the IMS network should be used for supplementary services management setting control originating from a UE or whether a CS network should be used. FIG. 4 illustrates a revised MO node and leaf diagram for the IMS MO according to an embodiment of the present disclosure. The node 400 and the leaves 402 are identified. The "Voice_Domain_Preference_E_UTRAN?" leaf is identified as 404. The "SMS_Over_IP_Networks_Indication?" leaf is identified as 406. The new leaf is labelled "SS_setting_control?" and is identified as 408. The new leaf 408 is defined in the paragraph below:

5.xa /<X>/SS_setting_control

The SS_setting_control leaf indicates the network operator's preference for selection of the domain to be used for SS setting interrogation and modification originated by the UE.

Occurrence: ZeroOrOne
Format: bool
Access Types: Get, Replace
Values: 0, 1
0—Indicates that the SS setting control is not to be invoked over the IP networks.
1—Indicates that the SS setting control is to be invoked over the IP networks.

It can be seen that new leaf 408 in accordance with this embodiment of the present disclosure indicates the network operator's preference for supplementary services management setting control originating from a UE. Specifically, through this leaf, the network operator can mandate the use of the IMS network for supplementary services management setting control originating from a UE, or the network operator can mandate that the IMS network is not used (effectively allowing the network operator to require that this is performed through CSFB). Advantageously, this embodiment of the present disclosure provides the network operator full control over the use of telephony and supplementary services (in combination with the other leafs defined within the 3GPP TS 24.167 MO discussed above for voice domain selection (5.27) and SMS selection (5.28)). There may be circumstances in which it is desirable to permit a user to perform certain actions over the IMS but to require the user to resort to CSFB for other actions. As one example, a network operator operating both an LTE network and an IMS network where the IMS network does not support voice over IP may wish to permit the use of CSFB for voice and "SMS over SGs" for SMS, but to continue to use the XCAP/Ut for making supplementary service changes. Additionally, if the UE moves to the CS domain and the network has an ICS MSC server, the UE can continue to use XCAP/Ut for SS setting control, even though voice call is initiated using CS signaling. This embodiment of the present disclosure enables this, and any other permutation through separating out the controls.

When performing supplementary services management setting control originating from a UE across the IMS network, the UE may access the Application Server in different ways. A first option for structured supplementary services is to interact with the AS across the XCAP/Ut interface as discussed above, and as specified in 3GPP TS 24.623 (Extensible Markup Language (XML) Configuration Access Protocol (XCAP) over the Ut interface for Manipulating Supplementary Services). A second option for structured supplementary services is through use of Session Initiation Protocol (SIP) based user configuration as specified in 3GPP TS 24.238 (Session Initiation Protocol (SIP) based user configuration). XCAP/Ut and SIP are competing mechanisms for performing supplementary services management setting control for structured supplementary services in the PS domain (using the IMS network). However, for unstructured (operator defined) supplementary services management setting control, the UE accesses the Application Server through use of USSD in IMS (USSI) as specified in 3GPP TS 24.390 (Unstructured Supplementary Service Data (USSD) using IP Multimedia (IM) Core Network (CN) subsystem IMS). In accordance with certain embodiments of the disclosure, and as shown in FIG. 4, the "SS_setting_control?" leaf 408 further defines additional sub-leaves for controlling the selective enabling of XCAP/Ut or SIP for structured supplementary services, and for selectively enabling USSI for unstructured supplementary services.

Referring to FIG. 4, node 410 is a placeholder for the detailed types of SS setting control and is defined in the paragraph below:
5.xb /<X>/SS_setting_control/<X>
This run-time node acts as a placeholder for one or more type of SS setting control.
Occurrence: ZeroOrMore
Format: node
Access Types: Get
Values: N/A Depending from the node 410 is a new leaf 412 for controlling the use of XCAP/Ut or SIP for structured supplementary services management setting control and a new leaf 414 for controlling the use of the PS domain for unstructured supplementary services management setting control. New leaf 412 is defined in the paragraph below:
5.xc /<X>/SS_setting_control/<X>/Structured_SS_Control The Structured_SS_Control leaf provides a means to define the method for which Structured Supplementary Services are controlled by the UE when SS setting control is to be invoked over IP networks (i.e. SS_setting_control set to "1").

The Country node value shall be a Mobile Country Code (MCC) as specified by ITU-T E.212 [10].
Occurrence: ZeroOrOne
Format: bool
Access Types: Get, Replace
Values: 0, 1
0—Indicates that the structured SS setting control is to be invoked using XCAP/Ut
1—Indicates that the structured SS setting control is to be invoked using SIP-based user configuration
The UE shall only use the information stored in the Structured_SS_control when SS setting control is to be invoked over IP networks (i.e. SS_setting_control set to "1").

It can be seen that new leaf 412 is only used to control the UE when leaf 408 is set to "1" to enable supplementary services management setting control over the IMS network. New leaf 412 controls the UE to either use XCAP/Ut or to use SIP for structured supplementary services management setting control. It will be appreciated that for embodiments of the present disclosure in which the IMS MO defined in 3GPP TS 24.167 is modified to include new leaf 408 without leaf 412, either both XCAP/Ut and SIP (at the discretion of the UE) may be enabled or disabled.

Referring again to FIG. 4, depending from the node 410 is a further new leaf 414 for controlling the use of the PS domain (for example, through USSI) for unstructured supplementary services management setting control. New leaf 414 is defined in the paragraph below:
5.xd /<X>/SS_setting_control<X>/Allow_Unstructured_SS_Control The Allow_Unstructured_SS_Control leaf provides a means to allow the UE to use Unstructured Supplementary Service Data over IMS (as specified in TS 24.390).
Occurrence: ZeroOrOne
Format: bool
Access Types: Get, Replace
Values: 0, 1
0—Indicates that the unstructured SS setting control is not to be allowed over IP networks
1—Indicates that the unstructured SS setting control is to be allowed using procedures in TS 24.390.

The UE shall only use the information stored in the Structured_SS_control when SS setting control is to be invoked over IP networks (i.e. SS_setting_control set to "1").

It can be seen that again new leaf 414 is only used to control the UE when leaf 408 is set to "1" to enable supplementary services management setting control over the IMS network. New leaf 414 controls the UE to enable or disable the use of the IMS network for unstructured supplementary services management setting control.

Figure 5:
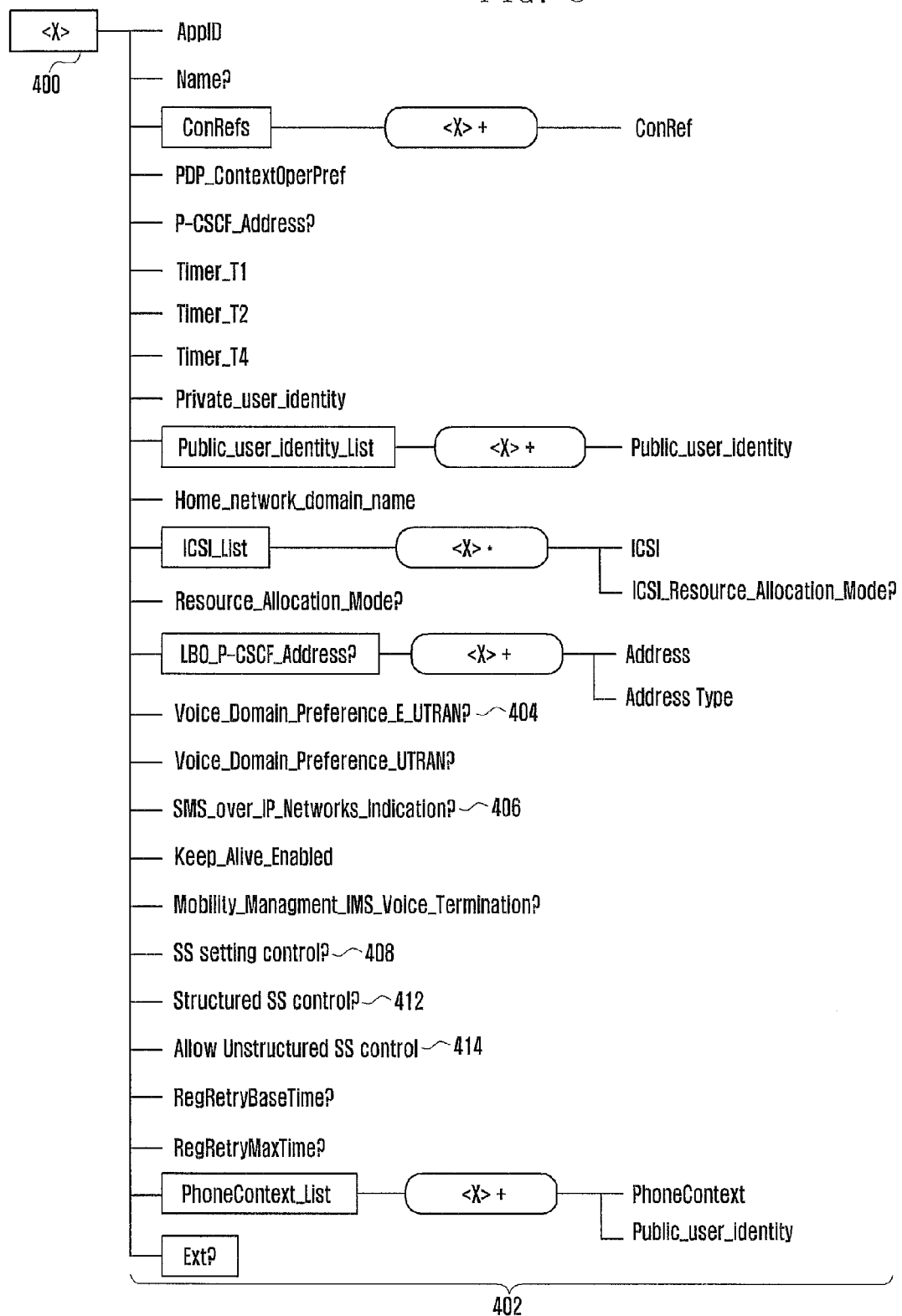
FIG. 5 illustrates an alternative modified version of the MO defined by 3GPP TS 24.167 in accordance with another embodiment of the present disclosure.

Referring to FIG. 5, this discloses an alternative embodiment in which the IMS MO of 3GPP TS 24.167 is modified to provide the three new leaves (408, 412, 414) independently of one another. New leaf 408 "SS_Setting_Control?" corresponds to leaf 408 described above and provides overall control for whether the PS domain (for instance, the IMS network) may be used for supplementary services management setting control. New leaf 412 "Structured-_SS_Control?" corresponds to leaf 412 described above and defines the access mechanism for structured supplementary services management setting control. New leaf 414 "Allow-_Unstructured_SS_Control?" corresponds to leaf 414 described above and controls the UE to enable or disable the use of the IMS network for unstructured supplementary services management setting control. Even though leaves 412 and 414 do not depend from leaf 408, it will be understood that leaf 408 still provides an override for all use of the IMS for supplementary services management setting control and unless this is enabled the UE does not use the information stored in leaves 412 and 414.

In accordance with a further embodiment of the disclosure, there is provided an alternative (or additional) approach in which a network operator is able to selectively enable or disable the use of the IMS network for all telephony and supplementary services (i.e., including voice, SMS and supplementary services management setting control originating from a UE). This may be desirable in the situation in which a UE is compliant with GSMA PRD IR.92, but the LTE network operator does not operate an IMS network. Alternatively, there may be a situation in which both the UE and the network are compliant with GSMA PRD IR.92, but different tariffs are available to subscribers selectively allowing access to the IMS network.

As discussed above, there may be situations in which a network operator would wish to selectively disable access to the IMS network for voice and SMS services (including setting control for supplementary services of voice and SMS). A network operator is already able to selectively enable or disable the use of the IMS network through use of a single leaf within the SDoUE MO defined by 3GPP TS 24.305, and in particular the configuration parameter "IMS?" defined in section 5.13. This configuration parameter enables an operator to enable or disable all use of IMS procedures. However, there may be circumstances in which the network operator may not wish to turn use of the IMS off, but does wish to be able to turn off the use of voice, SMS and supplementary services management setting control over the IMS. This would retain the use of the IMS for Rich Communication Services (RCS) while disabling the use of the IMS for telephony services and supplementary services management setting control. It is noted that the SDoUE MO already includes a configuration parameter "SupplementaryServices?" for disabling all supplementary services management setting control originating at the UE (defined by section 5.6 of 3GPP TS 24.305) but this is not related to any domain. If supplementary services management setting control is disabled through this configuration parameter, it is no longer possible even to use CSFB for supplementary services management setting control.

Figure 6:
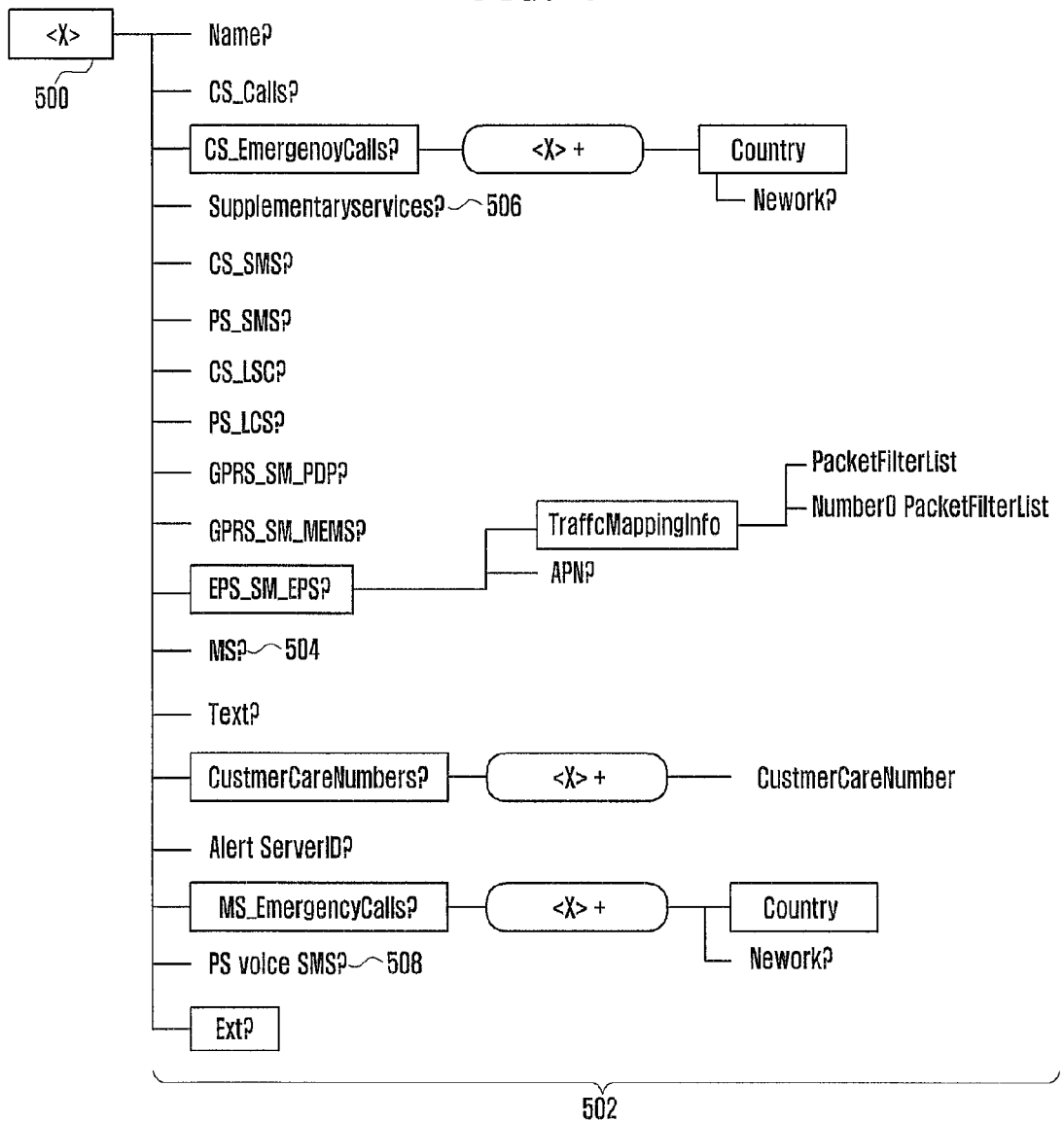
FIG. 6 illustrates a modified version of the MO defined by 3GPP TS 24.305 in accordance with an embodiment of the present disclosure.

FIG. 6 illustrates a revised MO node and leaf diagram for the SDoUE MO according to an embodiment of the present disclosure. The node 500 and the leaves 502 are identified. The existing "IMS?" leaf defined by section 5.13 of 3GPP TS 24.305 is labelled as 504. The existing "SupplementaryServices?" leaf defined by section 5.6 of 3GPP TS 24.305 is labelled as 506. The new leaf is labelled "PS_voice_and_SMS?" and is identified as 508. The new leaf 508 is shown in the paragraph below.

5.* /<X>/PS_voice_and_SMS?

The PS_voice_and_SMS indicates an operator's preference to enable or disable the capability to make voice calls over PS, SMS over IMS and supplementary service settings for voice and SMS using the PS domain.

Occurrence: ZeroOrOne

Format: bool

Access Types: Get

Values: 0, 1

0—Indicates that voice calls over PS, SMS over IMS and SS settings using PS domain are disabled 1—Indicates that voice calls over PS, SMS over IMS and SS settings using PS domain are enabled.

It can be seen that the new leaf in accordance with this embodiment of the present disclosure indicates the network operator's preference to enable or disable all use of the IMS network for telephony services and supplementary services management setting control originating from a UE. When use of the IMS network is enabled the UE may still optionally use CSFB when required. Advantageously, this modification to the MO in 3GPP TS 24.305 provides a very simple control mechanism for the network operator who would otherwise make multiple setting changes to turn off the use of the IMS network for telephony services and supplementary services management setting control originating from a UE through the modified IMS MO shown in FIGS. 4 and 5. However, this embodiment of the present disclosure may also be combined with the embodiments of the present disclosure described above using the modified IMS MO such that when the MO leaf in 3GPP TS 24.305 enables the use of the IMS network for all telephony services supplementary services management setting control originating from a UE, the network operator is still able to individually disable the use of the IMS for voice, SMS or supplementary services management setting control (and control the particular access mechanism across the IMS for supplementary services management setting control). Specifically, this embodiment of the present disclosure may be applied in combination with either of the above embodiments of the disclosure shown in FIGS. 4 and 5 for controlling all use of the IMS network for supplementary services management setting control originating from a UE or controlling certain uses of the IMS network for this purpose with specified access methods. If use of the IMS is enabled through the "PS_voice_and_SMS?" then the IMS MO of FIGS. 4 and 5 may require configuration. It will be appreciated that in other embodiments of the disclosure, the modified SDoUE MO of FIG. 6 may be used without the modified IMS MO of either FIG. 4 or 5.

Figure 7A:
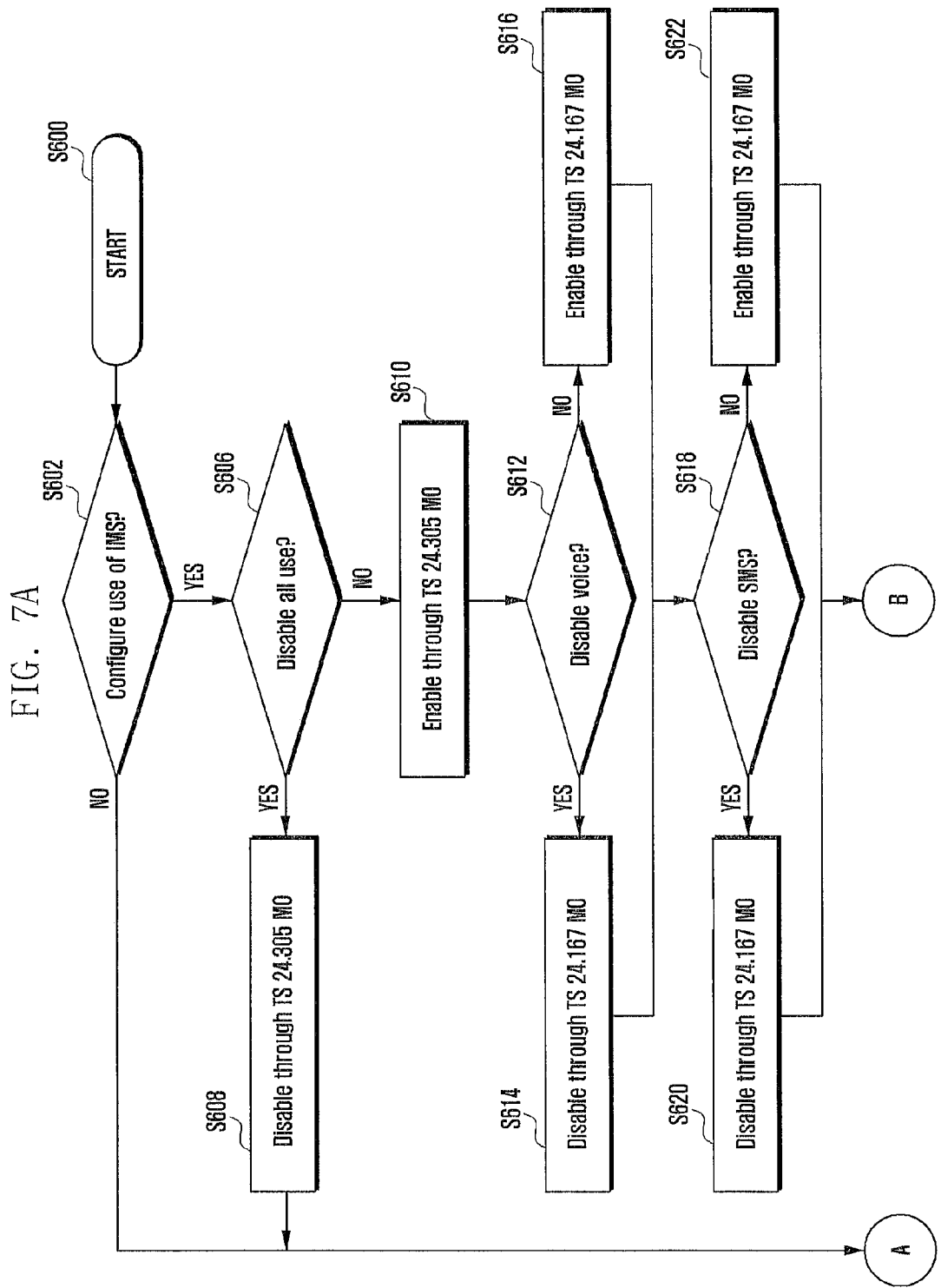
FIGS. 7A and 7B show a flow chart illustrating a method controlling supplementary services management setting control originating from a mobile terminal.
Figure 7B:
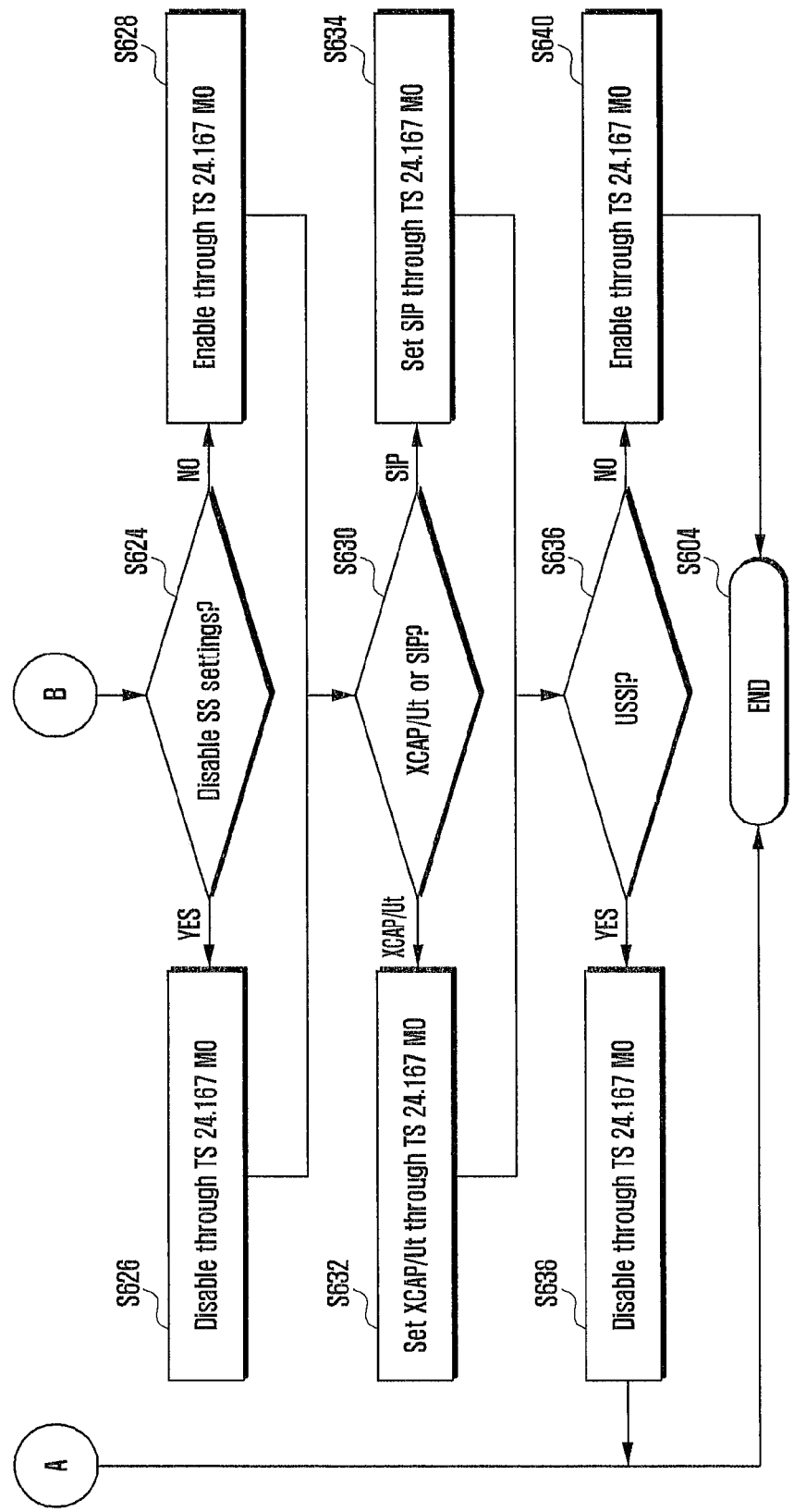

Referring now to FIGS. 7A and 7B, these show a flowchart illustrating the decision making process for a network operator to determine whether and how to selectively enable or disable different uses of the IMS network for telephony services or supplementary services management setting control originating from a UE. FIGS. 7A and 7B illustrate the situation in which the IMS MO of 3GPP TS 24.167 is modified according to FIG. 4 or 5 described above and the SDoUE MO of 3GPP TS 24.305 is modified according to FIG. 6 above. If only one MO is modified, then the flowchart of FIGS. 7A and 7B may require modification to remove the redundant operations.

The process begins at operation S600. At operation S602, a decision is made whether to configure the use of the IMS network by a UE for voice/SMS and SS management setting control for these services. If the decision is that no configuration is needed, then the process ends at operation S604. Otherwise, at operation S606, a decision is made whether to disable all use of the IMS. If the decision is to disable all use of the IMS for voice/SMS and SS setting control for these services, then at operation S608, the new "PS_voice_and_SMS?" leaf in 3GPP TS 24.305 is set to 0 indicating that use of the IMS network for telephony services or management setting of supplementary services is disabled, and the process ends at operation S604. Otherwise, at operation S610, the new "PS_voice_and_SMS?" leaf in 3GPP TS 24.305 is set to 1 indicating that use of the IMS network for telephony services or management setting of supplementary services is enabled.

At operation S612, a decision is made whether to disable the use of the IMS network for voice calls. If the decision is made to disable the use of the IMS network for voice calls, then at operation S614, this is disabled through the "Voice_Domain_Preference_E_UTRAN" leaf in 3GPP TS 24.167 described at section 5.27. Specifically, this leaf is set to 1. Otherwise, at operation S616, the "Voice_Domain_Preference_E_UTRAN" leaf in 3GPP TS 24.167 is set to 2, 3 or 4.

At operation S618, a decision is made whether to disable the use of the IMS network for SMS. If the decision is made to disable the use of the IMS network for SMS, then at operation S620, this is disabled through the "SMS_Over_IP_Networks_Indication" leaf in 3GPP TS 24.167 described at section 5.28. Specifically, this leaf is set to 0. Otherwise, at operation S622, the "SMS_Over_IP_Networks_Indication" leaf in 3GPP TS 24.167 is set to 1.

At operation S624, a decision is made whether to disable the use of the IMS network for supplementary services management setting control originating from a UE. If the decision is taken to disable the use of the IMS network for supplementary services management setting control originating from a UE, then at operation S626 this is disabled through the new "SS_setting_control?" leaf in 3GPP TS 24.167. Specifically, the leaf is set to 0. Otherwise, at operation S628, the new "SS_setting_control?" leaf in the modified IMS MO is set to 1.

At operation S630, a decision is made whether to mandate the use of XCAP/Ut or SIP for structured supplementary services management setting control through configuration of the "Structured_SS_Control?" leaf in 3GPP TS 24.167. If XCAP/Ut is selected, then at operation S632, the "Structured_SS_Control?" leaf is set to 0. If SIP is selected, then at operation S634, the "Structured_SS_Control?" leaf is set to 1.

At operation S636, a decision is made whether enable the use of USSI for unstructured supplementary service management setting control. This may be disabled through setting the "Allow_Unstructured_SS_Control?" leaf to 0 at operation S638 or enabled through setting the "Allow_Unstructured_SS_Control?" leaf to 1 at operation S640.

It will be appreciated that embodiments of the present disclosure provide a fine level of control for the network operator to enable or disable the use of an IMS network for a particular UE. It will further be appreciated that where the present disclosure is implemented, the UE may require modification to provide the appropriate logic to automatically switch to the correct settings when an MO for that UE changes.

It will be appreciated that the present disclosure has predominantly be described in the embodiments above in terms of how to control the use of the IMS network for voice calls, SMS messages and supplementary services management setting control originating from the UE.

It will be appreciated that embodiments of the present disclosure can be realized in the form of hardware, software, or a combination of hardware and software. Any such software may be stored in the form of volatile or non-volatile storage, for example, a storage device like a ROM, whether erasable or rewritable or not, or in the form of memory, for example, RAM, memory chips, device or integrated circuits, or on an optically or magnetically readable medium, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium including a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the operations of any method or process so disclosed, may be combined in any combination, except combinations where at least some of such features and/or operations are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the operations of any method or process so disclosed. It will be also be appreciated that, throughout the description and claims of this specification, language in the general form of "X for Y" (where Y is some action, activity or operation and X is some means for carrying out that action, activity or operation) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for configuring a mobile terminal by a network node in a mobile wireless communications network, the method comprising:
    configuring first setting information for the mobile terminal indicating whether first setting control information for supplementary services management is to be transmitted through an interne protocol multimedia subsystem (IMS) network between the mobile terminal and an application server, wherein the first setting control information originates from the mobile terminal; and
    transmitting the first setting information for the mobile terminal from a network node to the mobile terminal,
    wherein the first setting information for the mobile terminal instructs the mobile terminal to modify a first configuration parameter in a first managed object (MO) stored at the mobile terminal to indicate whether the first setting control information for supplementary services management is to be transmitted through the IMS network.

2. The method according to claim 1, further comprising:
    configuring second setting information for the mobile terminal indicating whether second setting control information for structured supplementary services management is to be transmitted through the IMS network between the mobile terminal and the application server using at least one of an extendable markup language (XML) configuration access protocol, an XCAP/Ut interface, a session initiation protocol (SIP) based user configuration, wherein the second setting control information originates from the mobile terminal; and
    transmitting the second setting information for the mobile terminal from the network node to the mobile terminal,
    wherein the second setting information for the mobile terminal instructs the mobile terminal to modify a second configuration parameter in the first MO stored at the mobile terminal to indicate whether the second setting control information for the structured supplementary services management is to be transmitted through the IMS network using at least one of the XCAP/Ut interface or the SIP-based user configuration.

3. The method according to claim 1, further comprising
    configuring third setting information for the mobile terminal indicating whether third setting control information for unstructured supplementary services management is to be transmitted through the IMS network between the mobile terminal and the application server using unstructured supplementary services data (USSD) in IMS (USSI), wherein the third setting control information originates from the mobile terminal; and
    transmitting the third setting information for the mobile terminal from the network node to the mobile terminal,
    wherein the third setting information for the mobile terminal instructs the mobile terminal to modify a third configuration parameter in the first MO to indicate whether the third setting control information for the unstructured supplementary services management is to be transmitted through the IMS network using the USSI.

4. The method according to claim 1, wherein the first MO comprises a leaf for configuring the IMS network, wherein the first MO for configuring the IMS network comprises the IMS MO.

5. The method according to claim 1, further comprising:
    configuring fourth setting information for the mobile terminal indicating whether a transmission of voice calls, short message service (SMS) messages and fourth setting control information for supplementary services management for voice services and SMS through the IMS network is enabled or disabled, wherein the fourth setting control information originates from the mobile terminal; and
    transmitting the fourth setting information for the mobile terminal from the network node to the mobile terminal,
    wherein the fourth setting control information for the mobile terminal instructs the mobile terminal to modify a fourth configuration parameter in a second MO stored at the mobile terminal to indicate whether the transmission of the voice calls, the SMS messages, and the fourth setting control information for the supplementary services management for the voice services and the SMS through the IMS network is enabled or disabled,
    wherein the fourth configuration parameter comprises a leaf in an MO for selectively disabling mobile terminal capabilities, and
    wherein the MO for selectively disabling mobile terminal capabilities comprises the selective disabling of user equipment capabilities (SDoUE) MO.

6. A method for operating a mobile terminal by a terminal in a mobile wireless communications network, the method comprising:
    receiving, from a network node, first setting information for the mobile terminal indicating whether first setting control information for supplementary services management is to be transmitted through internet protocol multimedia subsystem (IMS) network between the mobile terminal and an application server, wherein the first setting control information originates from the mobile terminal;
    configuring a first configuration parameter in a first managed object (MO) stored at the mobile terminal to indicate whether the first setting control information for supplementary services management is to be transmitted through the IMS network in response to the received first setting information; and
    transmitting the first setting control information for the supplementary services management to the application server through the IMS network, if the first configuration parameter indicates that the first setting control information for the supplementary services management is to be transmitted through the IMS network.

7. The method according to claim 6, further comprising:
    receiving, from the network node, second setting information for the mobile terminal indicating whether second setting control information for structured supplementary services management are to be transmitted through the IMS network between the mobile terminal and the application server using at least one of an extendable markup language (XML) configuration access protocol, an XCAP/Ut interface, or a session initiation protocol (SIP) based user configuration, wherein the second setting control information originates from the mobile terminal;

configuring a second configuration parameter in the first MO stored at the mobile terminal to indicate whether the second setting control information for the structured supplementary services management is to be transmitted through the IMS network using at least one of the XCAP/Ut interface or the SIP-based user configuration in response to the received second setting information; and transmitting the second setting control information for the structured supplementary services management to the application server through the IMS network using at least one of the XCAP/Ut interface or SIP-based user configuration according to the result of the determination, if the first configuration parameter indicates that the second setting control information is to be transmitted through the IMS network, and the second configuration parameter indicates that the second setting control information is to be transmitted through the IMS network using at least one of the XCAP/Ut interface or the SIP-based user configuration.

8. The method according to claim 6, further comprising:
receiving, from the network node, third setting information for the mobile terminal indicating whether third setting control information for unstructured supplementary services management is to be transmitted through the IMS network between the mobile terminal and the application server using unstructured supplementary services data (USSD) through the IMS network (USSI), wherein the third setting control information originates from the mobile terminal;

configuring a third configuration parameter in the first MO to indicate whether the third setting control information for the unstructured supplementary services management is to be transmitted through the IMS network using the USSI in response to the received third setting information; and transmitting the third setting control information for the unstructured supplementary services management to the application server using the USSI, if the first configuration parameter indicates that the third setting control information is to be transmitted through the IMS network, and the third configuration parameter indicates that the third setting control information is to be transmitted the IMS network using the USSI.

9. The method according to claim 6, wherein the first MO comprises a leaf for configuring the IMS network, wherein the first MO for configuring an IMS network comprises the IMS MO.

10. The method according to claim 6, further comprising:
receiving, from the network node, fourth setting information for the mobile terminal indicating whether a transmission of voice calls, short message service (SMS) messages and fourth setting control information for supplementary services management for voice and SMS through the IMS network is enabled or disabled, wherein the fourth setting control information originates from the mobile terminal; and configuring a fourth configuration parameter within a second MO stored at the mobile terminal to indicate whether the transmission of the voice calls, the SMS messages, and the fourth setting control information for supplementary services management for the voice services and the SMS through the IMS network is enabled or disabled in response to the received fourth setting information, wherein the fourth configuration parameter comprises a leaf within the second MO for selectively disabling mobile terminal capabilities, and wherein the second MO for selectively disabling mobile terminal capabilities comprises the selective disabling of user equipment capabilities (SDoUE) MO.

11. A network node in mobile wireless communications network, the network node configured to:
configure first setting information for the mobile terminal indicating whether first setting control information for supplementary services management is to be transmitted through an internet protocol multimedia subsystem (IMS) network between the mobile terminal and an application server, wherein the first setting control information originates from the mobile terminal; and transmit the first setting information for the mobile terminal to the mobile terminal, wherein the first setting information for the mobile terminal instructs the mobile terminal to modify a first configuration parameter in a first managed object (MO) stored at the mobile terminal to indicate whether the first setting control information for supplementary services management is to be transmitted through the IMS network.

12. The network node according to claim 11, the network node further configured to:
configure second setting information for the mobile terminal indicating whether second setting information for structured supplementary services management is to be transmitted through the IMS network between the mobile terminal and the application server using at least one of an extendable markup language (XML) configuration access protocol, an XCAP/Ut interface, or a session i protocol (SIP) based user configuration, wherein the second setting control information originates from the mobile terminal; and transmit the second setting information for the mobile terminal to the mobile terminal, wherein the second setting information for the mobile terminal instructs the mobile terminal to modify a second configuration parameter in the first MO stored at the mobile terminal to indicate whether the second setting control information for the structured supplementary services management is to be transmitted through the IMS network using at least one of the XCAP/Ut interface or the SIP-based user configuration.

13. The network node according to claim 11, the network node further configured to:
configure third setting information for the mobile terminal indicating whether third setting control information for unstructured supplementary services management is to be transmitted through an IMS network arc to be transmitted between the mobile terminal and the application server using unstructured supplementary services data (USSD) through the IMS network (USSI), wherein the third setting control information originates from the mobile terminal; and transmit the third setting information for the mobile terminal from the network node to the mobile terminal, wherein the third setting information for the mobile terminal instructs the mobile terminal to modify a third configuration parameter in the first MO to indicate whether the third setting control information for the unstructured supplementary services management is to be transmitted through the IMS network using the US SI.

14. The network node according to claim 11, wherein the first MO comprises a leaf for configuring the IMS network, wherein the first MO for configuring the IMS network comprises the IMS MO.

15. The network node according to claim 11, the network node further configured to:
configure fourth setting information for the mobile terminal indicating whether a transmission of voice calls, short message service (SMS) messages and fourth setting control information for supplementary services management for voice services and SMS through the IMS network is enabled or disabled, wherein the fourth setting control information originates from the mobile terminal; and
transmit the fourth setting information for the mobile terminal from the network node to the mobile terminal, wherein the fourth setting control information for the mobile terminal instructs the mobile terminal to modify a fourth configuration parameter in a second MO stored at the mobile terminal to indicate whether the transmission of the voice calls, the SMS messages, and the fourth setting control information for the supplementary services management for the voice services and the SMS through the IMS network is enabled or disabled,
wherein the fourth configuration parameter comprises a leaf in an MO for selectively disabling mobile terminal capabilities, and wherein the MO for selectively disabling mobile terminal capabilities comprises the selective disabling of user equipment capabilities (SDoUE) MO.

16. A mobile terminal in a mobile wireless communications network, the mobile terminal configured to:
receive, from a network node, first setting information for the mobile terminal indicating whether first setting control information for supplementary services management are to be transmitted through internet protocol multimedia subsystem (IMS) network between the mobile terminal and an application server;
configure a first configuration parameter in a first managed object (MO) stored at the mobile terminal to indicate whether the first setting control information for the supplementary services management is to be transmitted through the IMS network in response to the received first setting information; and
transmit the first setting control information for the supplementary services management to the application server through the IMS network, if the first configuration parameter indicates that the first setting control information for the supplementary services management is to be transmitted through the IMS network.

17. The mobile terminal according to claim 16, the mobile terminal further configured to:
receive, from the network node, a second setting information for the mobile terminal indicating whether second setting control information for structured supplementary services management is to be transmitted through the IMS network between the mobile terminal and the application server using at least one of an extendable markup language (XML) configuration access protocol, an XCAP/Ut interface, or a session initiation protocol (SIP) based user configuration, wherein the second setting control information originates from the mobile terminal;
configure a second configuration parameter in the first MO stored at the mobile terminal to indicate whether the second setting control information for the structured supplementary services management is to be transmitted through the IMS network using at least one of the XCAP/Ut interface or the SIP-based user configuration in response to the received second setting information; and
transmit the second setting control information for the structured supplementary services management to the application server through the IMS network using at least one of the XCAP/Ut interface or SIP-based user configuration according to the result of the determination, if the first configuration parameter indicates that the second setting control information is to be transmitted through the IMS network, and the second configuration parameter indicates that the second setting control information is to be transmitted through the IMS network using at least one of the XCAP/Ut interface or the SIP-based user configuration.

18. The mobile terminal according to claim 16, the mobile terminal further configured to:
receive, from the network node, a third setting information for the mobile terminal indicating whether third setting control information for unstructured supplementary services management is to be transmitted through an IMS network between the mobile terminal and the application server using unstructured supplementary services data (USSD) through the IMS network (USSI), wherein the third setting control information originates from the mobile terminal;
configure a third configuration parameter in the first MO to indicate whether the third setting control information for the unstructured supplementary services management are is to be transmitted through the IMS network using the USSI in response to the received third setting information for the mobile terminal; and
transmitting the third setting control information for the unstructured supplementary services management to the application server using the USSI, if the first configuration parameter indicates that the third setting control information is to be transmitted through the IMS network, and the third configuration parameter indicates that the third setting control information is to be transmitted the IMS network using the USSI.

19. The mobile terminal according to claim 16, wherein the first MO comprises a leaf for configuring the IMS network, and wherein the first MO for configuring the IMS network comprises the IMS MO.

20. The mobile terminal according to claim 16, the mobile terminal further configured to:
receive, from the network node, fourth setting information for the mobile terminal indicating whether a transmission of voice calls, short message service (SMS) messages and fourth setting control information for supplementary services management for voice and SMS through the IMS network is enabled or disabled, wherein the fourth setting control information originates from the mobile terminal; and
configure a fourth configuration parameter within a second MO stored at the mobile terminal to indicate whether the transmission of the voice calls, the SMS messages, and the fourth setting control information for supplementary services management for the voice services and the SMS through the IMS network is enabled or disabled in response to the fourth setting information, wherein the fourth configuration parameter comprises a leaf within the second MO for selectively disabling mobile terminal capabilities, and wherein the second MO for selectively disabling mobile terminal capabilities comprises the selective disabling of user equipment capabilities (SDoUE) MO.

\* \* \* \* \*